Patented Sept. 7, 1926.

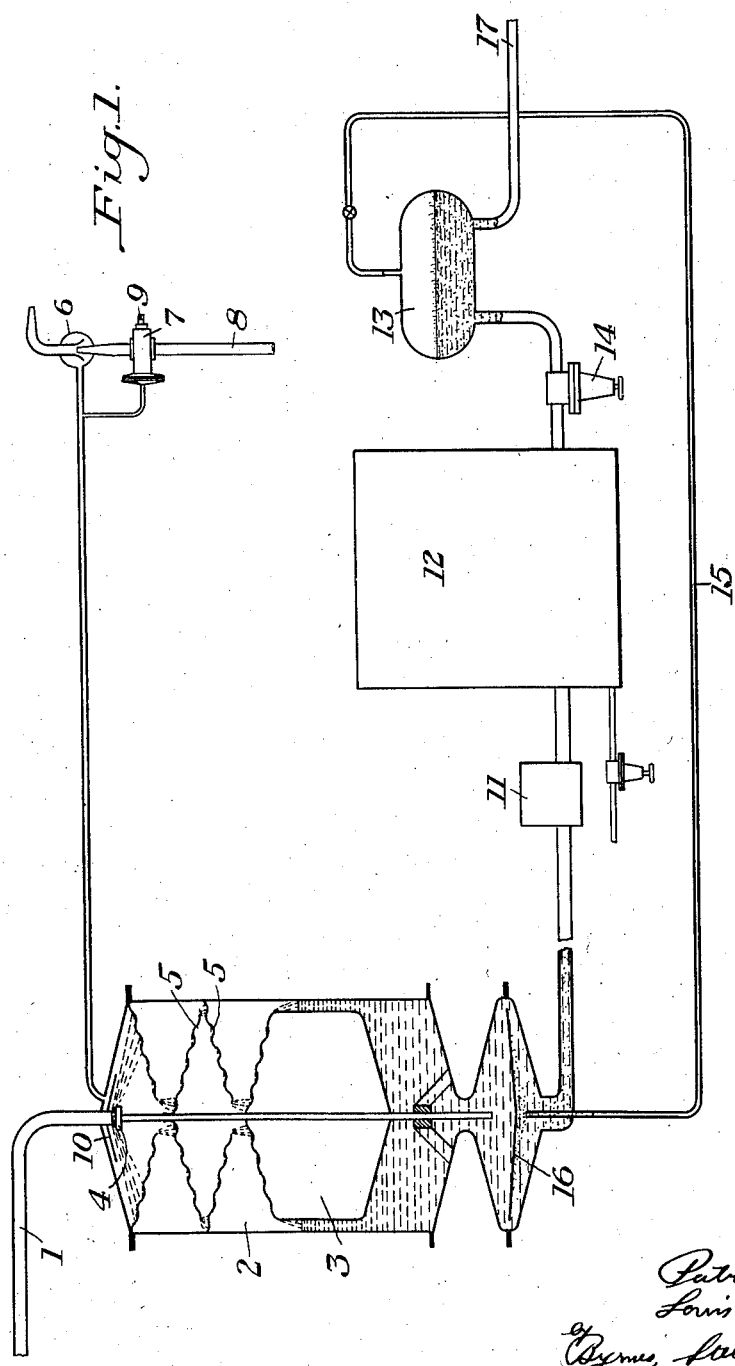

1,598,787

UNITED STATES PATENT OFFICE.

PATRICK W. SHIELDS, OF PITTSBURGH, AND LOUIS DE MARKUS, OF MONTROSE, PENN-SYLVANIA, ASSIGNORS TO McKENNA BRASS AND MANUFACTURING COMPANY, INC., OF PITTSBURGH, PENNSYLVANIA, A CORPORATION OF PENNSYLVANIA.

CARBONATING APPARATUS.

Application filed September 1, 1922. Serial No. 585,657.

The present invention relates broadly to methods of carbonating and apparatus therefor, and more particularly as used in connection with bottled soft drinks, carbonated water, dispensing, and the like.

In the soft drink industry it is common practice to carbonate or charge ordinary water with from two to eight times its own volume of carbon dioxide gas, the degree of carbonation depending on the product desired. At a given temperature and pressure, water will absorb carbon dioxide up to a definite saturation point, and in order to get a higher degree of carbonation, or greater saturation, it has heretofore been necessary to change the physical conditions by increasing the pressure or lowering the temperature, or both.

As is well known, pure water possesses a natural affinity for air, and ordinary tap water contains about 2% of air by volume. It has also been determined that the presence of air in solution lowers the capacity of the water to absorb carbon dioxide. The amount of dissolved air, in proportion to the amount of carbon dioxide added, is so small that the effect of its presence has usually been minimized or entirely disregarded, and where it has been taken into consideration, as shown for example in the U. S patents to Pindstofte, Nos. 1,064,535, 1,209,490 and 1,314,148, it has been proposed to remove the air from the water by the process of carbonization itself. This same result, however, occurs in practically all carbonators to a slight extent, since water has a greater affinity for carbon dioxide than for air.

Not only is such a method ineffective in that it does not remove any considerable portion of the dissolved air, but it is open to the serious objection that any air so removed collects with the carbon dioxide gas in the top of the carbonator, from which it must be periodically vented, or "snifted", as it is referred to in the art, to keep the carbonator from becoming air-bound. The air and gas being intimately associated, due to the elementary principle of diffusion of gases, (Dalton's law), it is impossible to separate them by gravity, and a considerable loss of carbon dioxide gas necessarily results every time the carbonator is snifted.

By the present invention, the objections to such methods are obviated. In accordance with our invention the water is effectively degasified by a separate step before it enters the carbonator. This results in a higher degree of carbonation for a given temperature and pressure than it is possible to attain with ordinary apparatus, since the de-aerated water can freely absorb the gas up to its saturation point, unhindered by the presence of air. As no air is displaced in the carbonator itself, the necessity for snifting is entirely overcome. Moreover, we have found that de-aerated water is less likely than ordinary water to lose its gas after carbonation. This results in a material saving of gas in bottle filling machines using such water. Ordinarily a high percentage of the gas goes out of solution in the filling machine, and is wasted. By the use of de-aerated water, actual experiment has shown it to be possible to reduce this gas loss in the filling machine to a very low percentage.

It is also highly desirable to use de-aerated water from the standpoint of the bottled product. Since the gas does not so readily go out of solution, it is possible to leave bottled goods open for as long as twenty-four hours and they will still contain carbon dioxide in excess of atmospheric carbonation. It is well known that carbon dioxide acts as a natural preservative of the bottled product, and it is generally accepted that three volumes of carbonation is necessary to make the goods self-preserving. Where a lower carbonation is desired in goods not containing a natural preservative such as tartaric acid, as in imitation grape drinks and the like, it has heretofore been necessary to add a separate preservative in order to prevent the growth of yeasts and bacteria in the bottle. The presence of such a preservative has necessitated the use of more flavoring syrup in order to disguise its taste. As the growths encountered in the art are all bacteriological, the removal of air from the product reduces the tendency of certain of these bacteria to grow. We have found that by using de-aerated water a lower degree of carbonation will make the goods self-preserving.

The accompanying drawings, which are largely diagrammatic, are illustrative only of one embodiment of the invention, it being understood that the drawings do not define the limits of our invention and that changes may be made in the construction and operation without departing from our invention or scope of our broader claims.

The accompanying drawing is a diagrammatic view of a carbonating apparatus embodying our invention.

In the illustrated embodiment of our invention, water to be carbonated passes from a supply line 1 into a de-gasifying chamber 2 of a suitable de-aerating apparatus. The rate of supply may be controlled in accordance with demands, by a float 3 operating a suitable valve 4. The entering water may be deflected by the valve 4 onto a series of pans 5 for effectively breaking it up to expedite the separation of the dissolved air and gases. A pressure which is preferably considerably below atmospheric may be maintained in the chamber 2 in any desired manner, as by a vacuum pump 6 of the water ejector type. In bottling plants the pump 6 may conveniently be incorporated with the soaker or bottle washer for supplying jets of cleaning water as will be clearly understood, such equipment requiring water jets in considerable number. The degree of vacuum maintained may be controlled by a suitable diaphragm valve 7 in the water line 8 supplying the pump 6, and regulable by a screw 9. A deflector 10 prevents any water being drawn from the de-aerating chamber into the vacuum line leading to the pump 6. A considerable depth of water is preferably maintained in the chamber 2 by the float 3 to give any air which may happen to be entrained in the down-moving water time to separate by flotation.

The carbonator pump 11 draws its water from the bottom of the de-aerating chamber 2. This water passes from the pump 11 to the carbonator 12, where it may be carbonated in any well known manner.

In order to take care of pump surges and the intermittent water requirements of the bottle filling machine, (not shown) it may be desirable to interpose a water chamber 13 and a regulating valve 14 between the carbonator and such filling machine. By this means a close regulation of the degree of corbonation is attainable. Any excess gas which may pass out of solution in the chamber 13 may be saved by taking it out through a line 15 communicating with the lower portion of the chamber 2. A deflector 16 breaks up the gas flow from the line 15, and spreads the gas bubbles, thereby facilitating their re-absorption by the de-aerated water. In this manner the water may be carbonated up to the saturation point at the reduced pressure in the chamber 2 before it enters the carbonator proper, lengthening the period of carbonation and thereby insuring that the water will be carbonated up to its saturation point. The amount of carbon dioxide supplied to the chamber 2 through the line 15 is no greater than the degasified water is capable of absorbing at its reduced pressure. The pump 11 supplying the degasified water to the carbonator changes its physical condition by greatly increasing the pressure thereof. This increased pressure increases the absorptive capacity of the water, thereby permitting a further saturation in the carbonator proper. The carbonated water may be fed from the chamber 13 to the filling machine through a suitable outlet 17.

Certain advantages of our invention arise from the separate and positive degasifying of the water for bottling purposes before it enters the carbonator, thereby increasing the affinity of the water for the carbon dioxide. Further advantages arise from the elimination of snifting with its resulting loss of gas, and the troublesome mechanism for accomplishing the same.

Still further advantages arise from the greatly improved quality of the product, not only from a commercial but also from a hygienic standpoint; and from the savings in carbon dioxide gas which are made possible by our invention.

The terms "carbonation" and "carbonating" are generically used in this specification and claims, to include any known means of bringing together water and carbon dioxide to induce the solution of the carbon dioxide in the water, as it will be evident that any apparatus for this purpose may be utilized in accordance with the present invention.

We claim:

1. In a carbonating apparatus, degasifying means comprising a chamber, means for regulating the quantity of water supplied to said chamber, means for maintaining reduced pressure conditions in said chamber, and means for delivering carbon dioxide to the degasified water in said chamber.

2. In a carbonating apparatus, degasifying means comprising a chamber, means for regulating the quantity of water supplied to said chamber automatically in accordance with demands on said chamber, means for maintaining reduced pressure conditions in said chamber, and means for delivering carbon dioxide to the degasified water in said chamber in no greater amount than it is capable of absorbing under its physical condition.

3. In a carbonating apparatus, degasifying means comprising a chamber, means for regulating the quantity of water supplied to said chamber, means for maintaining reduced pressure conditions in said chamber, means for delivering carbon dioxide to the degasified water in said chamber, and a pressure-increasing pump for withdrawing the carbonated water from said chamber.

In testimony whereof we have hereunto set our hands.

PATRICK W. SHIELDS.
LOUIS DE MARKUS.